Nov. 26, 1968 L. E. SIMPSON ET AL 3,413,061

MICROFILM READER

Filed Feb. 2, 1966 2 Sheets-Sheet 1

WILLIAM EUGENE KAROW,
LEWIS EDWARD SIMPSON,
*INVENTORS*

BY Leon D. Rosen
Albert Rosen

ATTORNEYS

WILLIAM EUGENE KAROW,
LEWIS EDWARD SIMPSON,
*INVENTORS*

BY Leon D. Rosen
Albert Rosen

ATTORNEYS 3,413,061
Patented Nov. 26, 1968

3,413,061

MICROFILM READER

Lewis E. Simpson, 255 W. 234th St., Wilmington, Calif. 90744, and William E. Karow, 7367 W. 93rd Place, Los Angeles, Calif. 90045

Filed Feb. 2, 1966, Ser. No. 527,646
4 Claims. (Cl. 353—23)

ABSTRACT OF THE DISCLOSURE

An optical reader for reading flat film having micro-images comprising a transparent carrier platform for holding the film. The platform having a transparent cover hinged to the platform at its rear to hold down the film, and a projection fixed to the rear of the cover for abutting the housing to lift the cover as the platform is moved out of the housing. The platform is moved in and out of the housing by sliding it, but is moved laterally by rotation of a knob on the platform which rotates a drive wheel which is rotatably engaged with a rod fixed to the housing. The knob and drive wheel are coupled in a telescoping arrangement to allow the platform to move toward and away from the drive wheel.

This invention relates to devices for reading size-reduced transparency records and the like.

Space limitations often necessitate the storage of business records in a greatly size-reduced form, and generally on micro-film transparencies to enable easy magnification and reading. It has been found especially convenient for handling, to record a large number of business record pages on a single transparent sheet of film, these sheets often being referred to as "microfiche" or "fiche."

Optical readers for reading fiche and the like generally include a point-like light source which shines a light beam that passes through the transparency and is then focused on a ground-glass or similar screen. The light source, which is generally an incandescent lamp, generates considerable heat which is hard to dissipate and which can damage the transparencies. This is especially true where the reader is to be used in well-lighted offices and where, therefore, high wattage bulbs are used. As a result, readers heretofore have been constructed with the light source placed at the top of the reader where heat could readily be dissipated, have used high speed cooling fans with their inherent noise, or both. Placing the light source at the top of the reader generally necessitates placement of the transparency also at the top, which makes operation of the reader inconvenient, and the use of fan cooling causes disturbing noises. The foregoing has usually resulted in a reader assembly characterized by a relatively high bulk, and if the light source is located at the front and bottom of the assembly, an even larger bulk and even greater heat problem.

In order to read one of numerous pages on a transparency sheet, the fische-holding platform must be precisely moved along both its width and length. Normally a rack and pinion mechanism is used for at least one direction of travel. However, the rack and pinion assembly proves costly, has backlash, and is easily damaged.

The platform on which the fiche is placed for reading usually consists of a glass plate for holding the fische, and a glass cover plate which is moved onto the fiche, sandwiching it in place. In order to remove or insert the fiche, the cover must be lifted and held up. A relatively low cost means for automatically lifting the cover, when the platform is partially withdrawn from the reader, would be of great convenience. Such automatic lifting means should be characterized by a small number of parts to assure reliable operation over a long period of time.

Accordingly, one object of the present invention is to provide an optical reader system which is more convenient to use than heretofore.

Another object is to provide an improved optical reader which is more efficient at dissipating heat than those available heretofore.

Another object is to provide an improved and simple optical reader which provides a bright image without fan-generated noise.

A further object is to provide an improved, economical, and efficient mechanism for moving an optical reader platform.

Still another object is to provide improved means for automatically placing an optical reader in position to receive or unload microfiche transparencies.

These and other objects are attained by an optical reader having a relatively large horizontal distance be tween the light source and the station for receiving transparencies to be read. The light source and transparency-holding station are located near the bottom of the reader so that its operation is simple; the light source is also located near the rear of the reader, and the transparency-holding station is located near the front, so that heat rising from the light source does not damage the transparencies.

Lateral movement of the transparency-holding platform, in one embodiment, is accomplished by a rubber wheel which bears against a threaded rod. This combination functions like a rack and pinion, but has many advantages, including those of virtually no backlash, resistance to damage, and low cost.

The transparent cover plate, which holds transparencies in place on the platform, is lifted automatically when the platform is moved out of the reader for access to the transparency. This is accomplished by means of a projection fixed to the pivoted cover plate, which strikes a part of the optical reader housing and rotates the cover plate as the platform is moved out.

The foregoing and other features will be described in detail in the accompanying specifications and claims and by the drawings, wherein:

Figure 1:
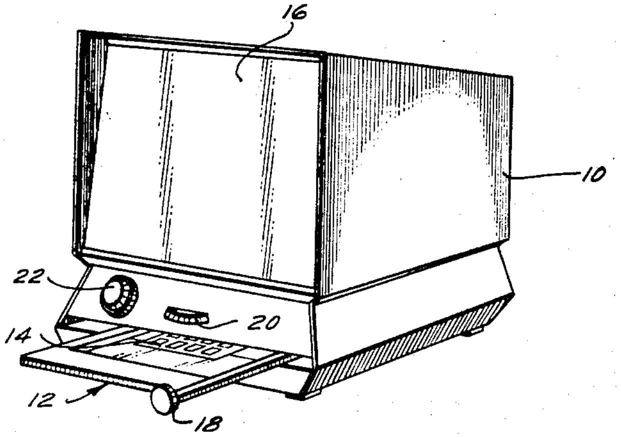
FIG. 1 is a perspective view of the optical reader of the invention.

The optical reader shown generally in FIG. 1 comprises a housing 10, a moveable platform 12 for receiving transparencies such as fiche 14, and a screen 16 for displaying a greatly enlarged image of a small portion of the fiche. The fiche 14 typically has a number of image portions on it, arranged in columns and rows, and with each image portion representing a page of text to be read. Different portions of the fiche 14 can be imaged on the screen 16 by moving the platform 12. The platform is moved laterally by turning a knob 18, and is moved in and out by pushing and pulling on the platform. A focusing dial 20 moves lens elements toward and away from the fiche to clearly focus the image on the screen. A brightness knob 22, connected to a rheostat (not shown) can be turned to adjust the brightness of the light source and thus the brightness of the image on the screen.

Figure 2:
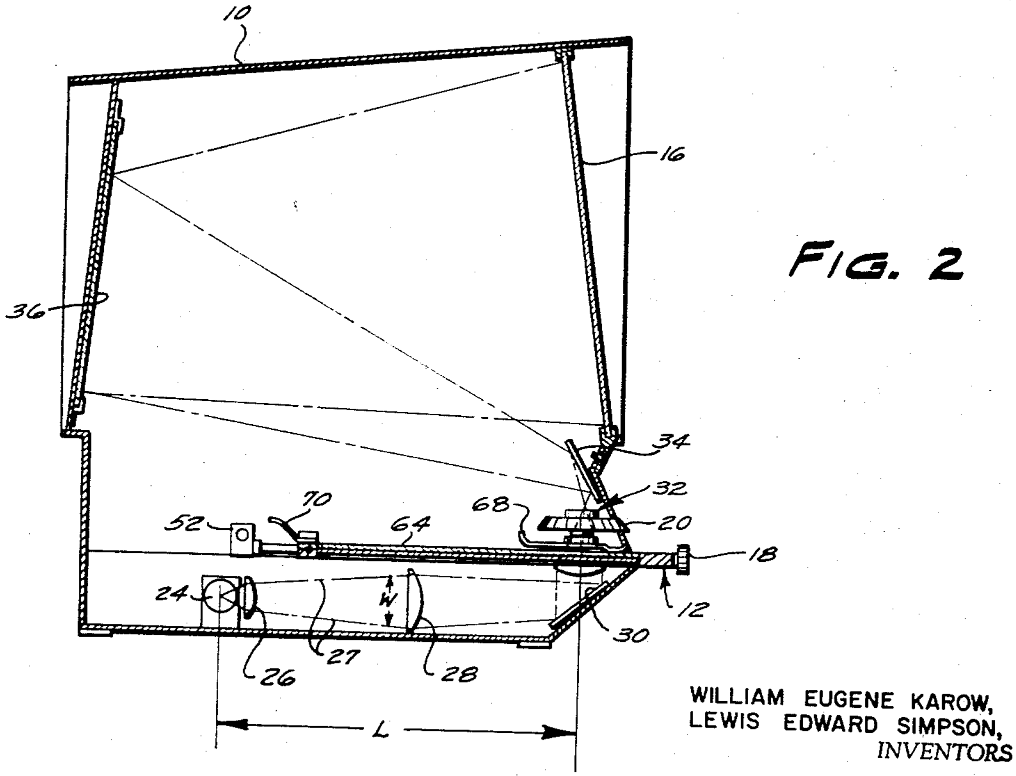
FIG. 2 is a sectional side view of the optical reader of FIG. 1.

The optical reader is shown in greater detail in the sectional side view of FIG. 2. The optical path comprises an incandescent lamp 24 mounted near the rearward portion of the reader, and condensing lenses 26 and 28 for providing a bright but relatively narrow beam 27 of light. A mirror 30 reflects the beam 27 upwardly so that it passes through a small area of the fiche to be read, the fiche lying on the platform 12. The light beam 27 thereafter passes through a focusing lens assembly 32, is reflected by two mirrors 34 and 36, and the image of the fiche is brought to a focus on the back of the translucent screen 16. A dial 20 is rotatably mounted on the housing 10, and is threadably engaged with the lens assembly 32. By turning the dial 20, the lens assembly 32 moves toward and away from the fiche on the platform, and enables sharp focusing of the fiche image on the screen 16.

Heat from the lamp 24 rises into the rearward portion of the housing 10, and is relatively isolated, horizontally, from the area where the fiche is located, even when the platform is in its most inward position within the housing. This is accomplished by placing the lamp 24 in a position which is spaced horizontally from every position which may be taken by the fiche when it is riding on the platform. Thus, a relatively high wattage lamp can be used in a position lower than that of the fiche without the necessity for fan cooling. In order to keep the position of the platform 12 near the table top or other surface on which the optical reader rests, to enable convenient operation, the light beam must be narrow between the light source 24 and the fiche in relationship to its relatively great length. The maximum light beam width W should be no more than about one-third its length L as measured between the source and the first mirror 30; the first mirror 30 is the one positioned below the fiche portion to be imaged.

Any portion of the fiche can be imaged by positioning that portion in the path of the light beam 27 by motion of the platform 12. Platform movement into and out of the housing 10 is accomplished by pushing and pulling the platform. Lateral platform movement, which often must be accomplished precisely since successive image portions are usually oriented in lateral adjacency, is accomplished by rotation of the knob 18. The lateral moving mechanism is shown in greater detail in FIG. 3.

Figure 3:
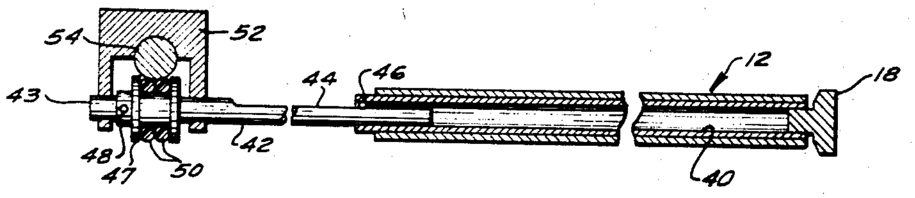
FIG. 3 is a partial view showing the platform moving mechanism of the optical reader of FIG. 1.

As shown in FIG. 3, the platform advancing knob 18 is fixed to the end of a length of tubing 40 which runs through one side of the platform 12. A shaft 42 having a long flattened portion 44 is rotatably fixed to the tubing by a pin 46, but is free to slide into and out of the tubing. The inner end of the shaft is fixed to a drive wheel 47 by a pin 48. Two drive rings 50 of elastomeric material, which may be common O-rings, are disposed in a groove in the drive wheel.

A support 52 held on a rod 54 supports the inner end portion 43 of the shaft 42 with upward pressure. Thus, the drive rings 50 are pressed against the bottom of the rod 54. The bottom of the rod is serrated, to provide secure engagement with the rings 50. Thus, when the knob 18 is rotated, thereby turning the shaft 42 and drive rings 50, the entire platform moves laterally.

Figure 4:
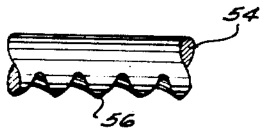
FIG. 4 is a partial view of the rod of FIG. 3 showing the form of serrations thereon.

FIG. 4 shows the form of the serrations 56 on the bottom of the rod 54, which may be formed by turning threads on the rod while it is held off the axis of rotation of the cutting lath or other forming machine. This configuration of the rod makes it economical to produce, yet it serves multiple functions: the serrated portion of the rod serves the function of a rack to engage the rings 50, while the top portion holds the support 52. The combination of the rings 50 and serrated rod 54 have the advantages of eliminating backlash, preventing free movement of the platform (which movement may cause loss of platform position) by virtue of the deformation of the rings, and resisting damage when the platform is accidently hit.

Figure 5:
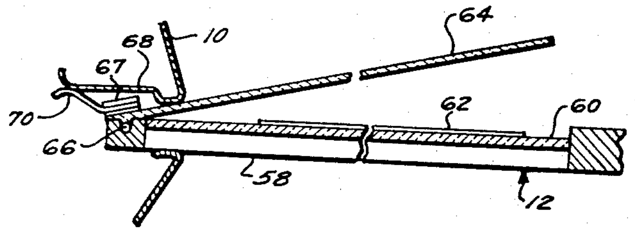
FIG. 5 is a partial view, showing the cover lifting mechanism of the optical reader of FIG. 1.

The platform 12 shown in detail in FIG. 5, comprises a frame 58 which supports a transparent base 60 of glass or the like upon which transparencies such as fiche 62 are laid. A cover plate 64 of glass is hinged at 66 to the frame. The cover plate normally lies in facewise engagement with the fiche and base to keep the fiche from moving. However, the cover must be lifted in order to remove or insert the fiche.

The cover 64 can be lifted appreciably only when the platform 12 is largely withdrawn from the housing 10. When the platform is well within the housing, a portion of the housing forming a roof 68 at the opening within which the platform slides, prevents appreciable lifting of the cover 64.

When the platform 12 is nearly withdrawn from the housing, the cover 64 lifts automatically by reason of the engagement of a projection 70 with the roof portion 68. As the platform is withdrawn, the projection 70 is pressed down by the roof portion 68 and the cover 64 is lifted. The roof portion 68 prevents the cover from suddenly flying open. The projection 70 is of a spring material so that it bends and does not exert a large force tending to lift the cover further than the roof portion allows. The projection 70 also serves to cushion the platform, when the platform is pushed into the housing, as can be seen in FIG. 2. The projection strikes the support 52 and bends before the platform hits the support. A projection 70 of spring steel with a coating of Teflon tape has been found to provide the necessary flexible characteristics and to slide easily under the roof portion of the housing.

It may be noted that the shaft at 66 lies in grooves at opposite sides of the platform. When the platform is in the positon furthest within the housing, the cover can be lifted and removed for cleaning (if the screen 16 is first removed). A stop 67 on the back of the cover prevents accidental movement of the platform completely out of the housing.

Optical readers of the type described have been built and tested. Among other characteristics, the readers were able to accommodate standard movie-projection type 300 watt bulbs without fan cooling or excessive heating. This provided a much brighter image than available with the usual 100 watt bulbs, and enabled the efficient reader use in bright offices.

Figure 6:
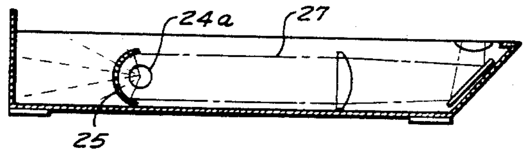
FIG. 6 is a partial view of another embodiment of the invention as applied to an optical reader similar to that shown in FIG. 2.

While heating of the optical reader by rising convection currents is important, heating of the fiche by the beam of light passing through it is also a limiting factor, especially since a portion of the fiche may remain in the beam for a period of a minute or longer. Heating of the fiche by the beam of light can be greatly reduced by another embodiment of the invention, illustrated in the partial view of FIG. 6. The light source in this embodiment comprises a quartziodide bulb **24*a* and a parabolic mirror 25** having a dichroic reflecting surface, in place of the usual bulb with a reflective coating on the surface on the bulb. A dichroic reflecting mirror has a number of transparent coatings, each having a thickness which is a fraction of the wavelength of the light which it is designated to reflect or transmit. Such a mirror can be made to reflect only a certain band of wavelengths. Thus, by reflecting only visible light and not infrared rays, the heat in the light passing through the fiche is reduced. An optical reader using a quartz-iodide bulb of 150 watts and a dichroic mirror with fourteen coatings provided as much light as a normal 450 watt projector bulb would provide, with no more heating of the fiche than occurs with an approximately 150 watt projector bulb.

While particular embodiments of the invention have been described and illustrated herein, many variations will be apparent to those skilled in the art and the invention is limited only by a just interpretation of the following claims.

We claim:

1. An optical reader for reading flat film having microimages comprising:

a housing including means for passing light to said microimages, a viewing screen, and lens means for forming an image on said viewing screen;

a platform for holding film, having a rear portion disposed within said housing and a front portion projecting from said housing;

means mounted on said housing for supporting said platform in a first direction of motion wherein said platform moves laterally, and a second direction of motion wherein said platform moves in an in-and-out direction relative to said housing;

rod means mounted on said housing for guiding said platform in one of said directions of motion;

drive wheel means rotably engaged with said rod means for rolling along said rod means;

a shaft coupled to said drive wheel means for rotating it;

means coupling said platform and said shaft for fixing their relative position in said first direction of motion while enabling their relative rotation and relative movement with respect to said second direction of motion; and means rotatably mounted on said platform and rotatably fixed to said shaft for rotating it to drive said drive wheel along said rod means.

2. An optical reader as defined in claim 1, wherein:

said means for coupling said platform and said shaft comprises a tube disposed about said shaft and rotatably mounted on said platform and pin means engaged with said shaft and said tube for preventing their relative rotation while allowing longitudinal sliding of said shaft in said tube; and said means rotatably mounted on said shaft comprises a knob mounted on said tube.

3. An optical reader as defined in claim 1, wherein:

said drive wheel means comprises a rim portion of elastomeric material and means for pressing said rim portion against said rod means, whereby to permit relative sliding of said drive wheel means and said rod means when said frame is accidentally hit.

4. An optical reader comprising:

a housing including means for passing light to microimages, a viewing screen, and lens means for forming an image on said viewing screen;

a platform for holding film mounted on said housing for movement laterally and in a direction in and out of said housing;

rod means mounted on said housing and extending laterally, for guiding said platform in lateral motion;

a drive wheel having a rim portion engaged with said means for rolling therealong;

tube means rotatably mounted on said platform for engaging a shaft;

a shaft having a first end fixed to said drive wheel and a second end disposed within said tube means;

pin means for coupling said tube and shaft to fix their relative rotative position while allowing their relative longitudinal sliding; and a knob fixed to said tube to rotate it.

References Cited

UNITED STATES PATENTS

| | | | |
|---|---|---|---|
| 2,701,979 | 2/1955 | Pratt et al. | 88—24 |
| 3,267,801 | 8/1966 | Abbott et al. | 88—24 |
| 1,894,005 | 1/1933 | Rose | 88—24 |
| 2,949,813 | 8/1960 | Wilton et al. | 88—24 |
| 3,224,326 | 12/1965 | Brownscombe | 88—24 |

NORTON ANSHER, *Primary Examiner.*

RICHARD M. SHEER, *Assistant Examiner.*